Figure 1:
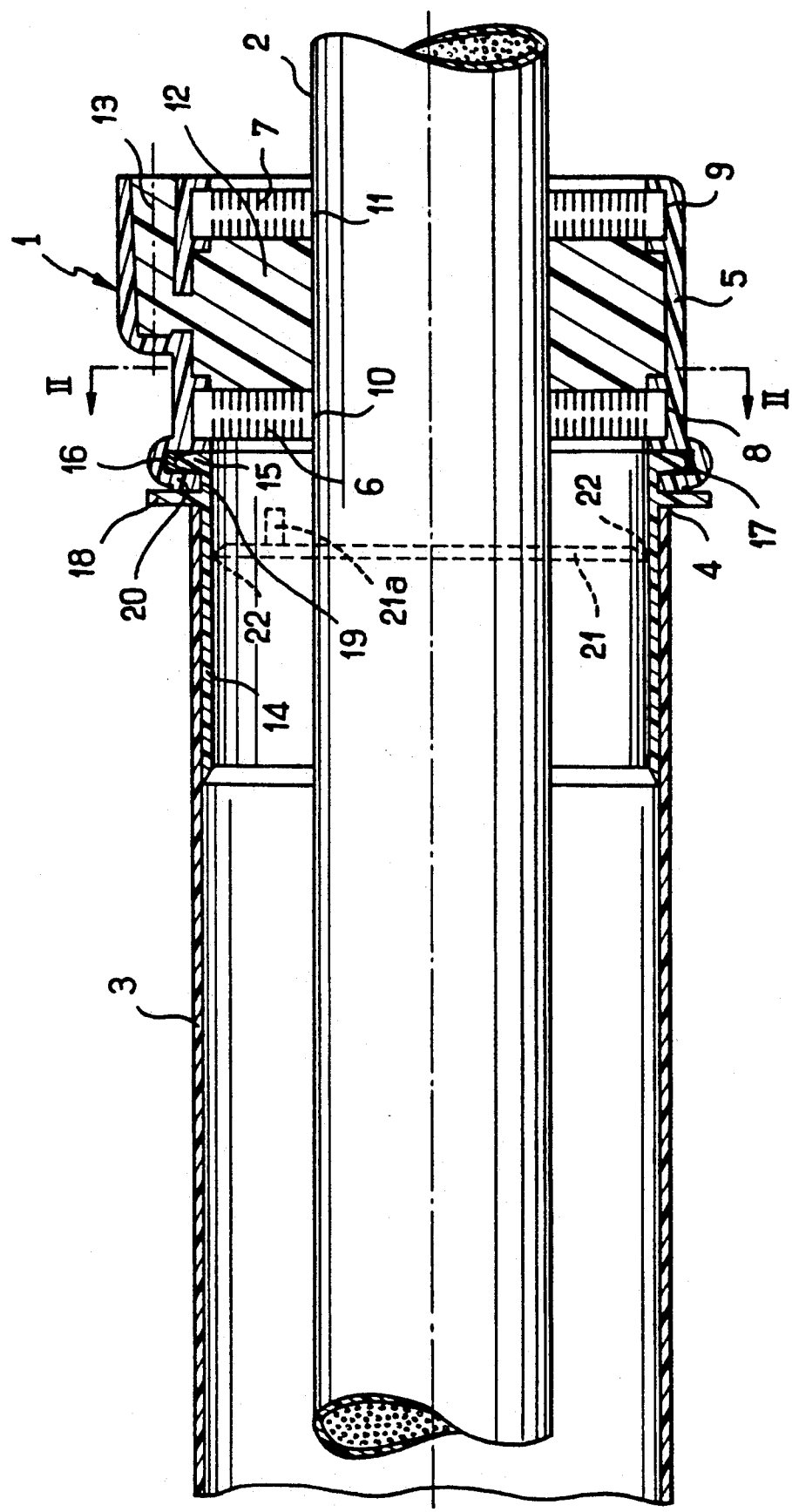

United States Patent [19]

Morel et al.

[11] Patent Number: 5,302,779
[45] Date of Patent: Apr. 12, 1994

[54] PLUG FOR FIXING IN AN IMPERMEABLE MANNER AN ELECTRIC CABLE TO AN OPENING AND CABLE PROTECTION SLEEVE COMPRISING SUCH PLUGS

[75] Inventors: Jacques Morel; Didier Morel, both of Chateauneuf-en-Thymerais, France

[73] Assignee: Etablissements Morel - Ateliers Electromechaniques de Favieres, Chateauneuf-en-Thymerais, France

[21] Appl. No.: 938,138
[22] PCT Filed: Feb. 20, 1991
[86] PCT No.: PCT/FR91/00135
§ 371 Date: Dec. 10, 1992
§ 102(e) Date: Dec. 10, 1992
[87] PCT Pub. No.: WO92/15138
PCT Pub. Date: Sep. 3, 1992
[51] Int. Cl.⁵ .............................. H02G 15/08
[52] U.S. Cl. ........................ 174/92; 174/76; 174/77 R; 174/93
[58] Field of Search .............. 174/92, 93, 76, 77 R, 174/82, 65 G, 41

[56] References Cited

U.S. PATENT DOCUMENTS

| | | | |
|---|---|---|---|
| 3,769,443 | 10/1973 | Pierzchala et al. | 174/76 X |
| 3,935,373 | 1/1976 | Smith et al. | 174/77 R |
| 4,262,167 | 4/1981 | Bossard et al. | 174/92 |
| 4,666,240 | 5/1987 | Caron et al. | 174/93 |
| 4,704,499 | 11/1987 | Faust | 174/92 |
| 4,752,653 | 6/1988 | Bachel et al. | 174/93 |
| 4,861,946 | 8/1989 | Pichler et al. | 174/92 |
| 4,933,512 | 6/1990 | Nimiya et al. | 174/92 |

FOREIGN PATENT DOCUMENTS

| | | |
|---|---|---|
| 0023099 | 1/1981 | European Pat. Off. . |
| 0073748 | 3/1983 | European Pat. Off. . |
| 0098765 | 1/1984 | European Pat. Off. . |
| 0206854 | 12/1986 | European Pat. Off. . |
| 0246113 | 11/1987 | European Pat. Off. . |
| 419820 | 10/1925 | Fed. Rep. of Germany . |
| 2826584 | 12/1979 | Fed. Rep. of Germany . |
| 2466887 | 4/1981 | France . |
| 2596215 | 9/1987 | France . |
| 2193605 | 2/1988 | United Kingdom . |

Primary Examiner—Morris H. Nimmo
Attorney, Agent, or Firm—Young & Thompson

[57] ABSTRACT

A plug that makes it possible to fix in an impermeable manner an electric or telephone cable (2) to a circular opening (4) for passage of the cable. It comprises a hollow body (5) constituted by two shells intended to be fixed around the cable (2) and comprising at least two jaws (6, 7) which are retained radially in the body (5). Each jaw comprises a central opening (10, 11) for passage of the cable (2) and is supported radially on this cable at the time of fixing by clamping of the two shells to one another, the two jaws defining between them a chamber (12) intended to be filled with a sealing material. The hollow body (5) has structure for fixing it in a removable and impermeable manner to the circular opening (4) for passage of the cable.

24 Claims, 6 Drawing Sheets

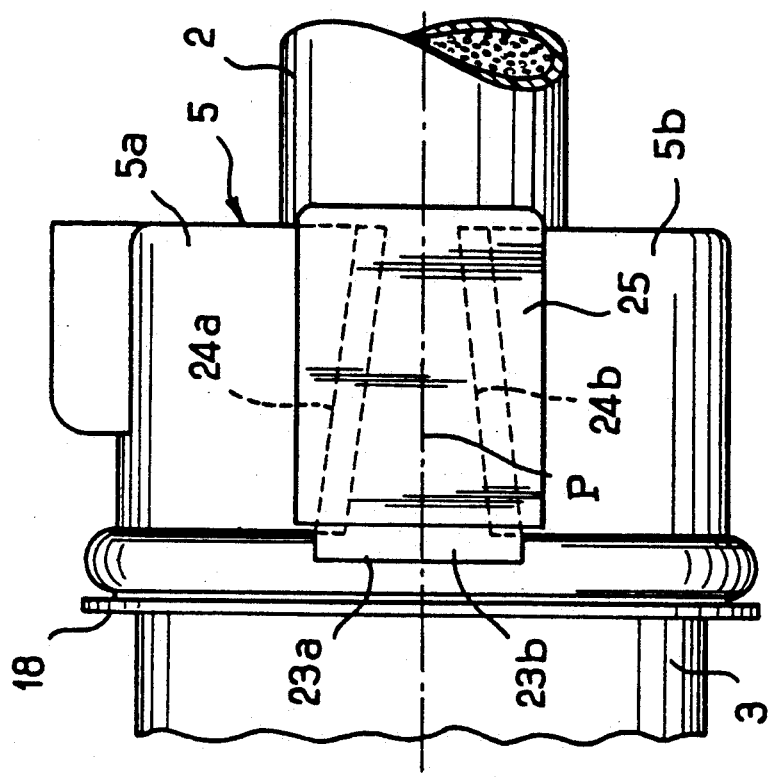
FIG_3
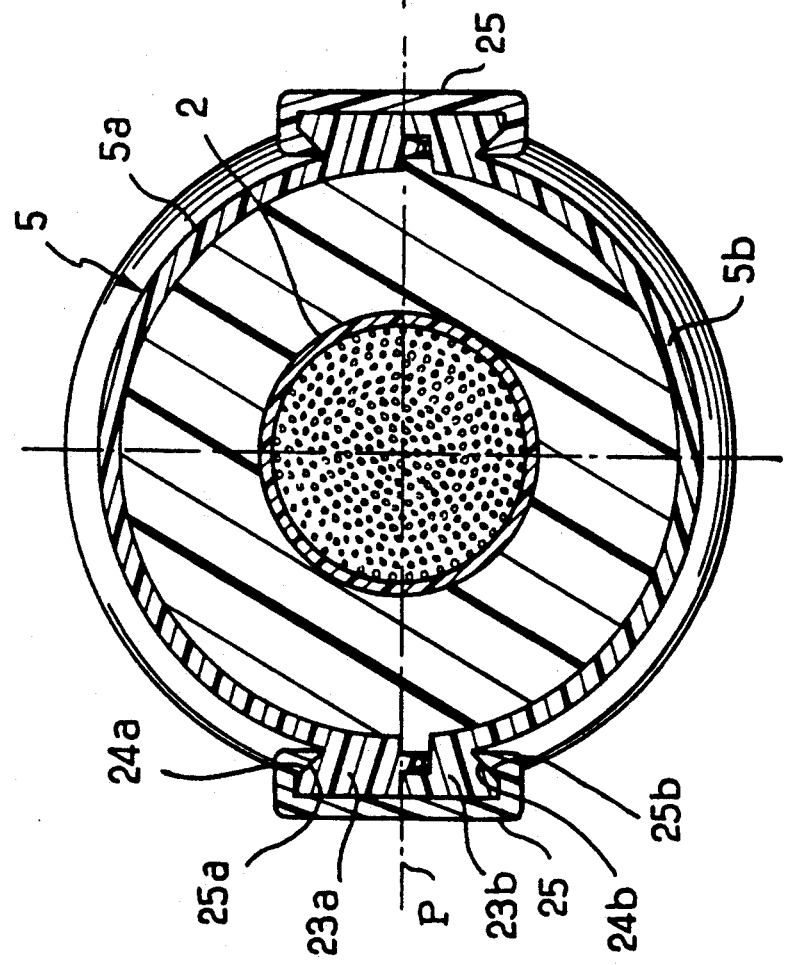
FIG_2

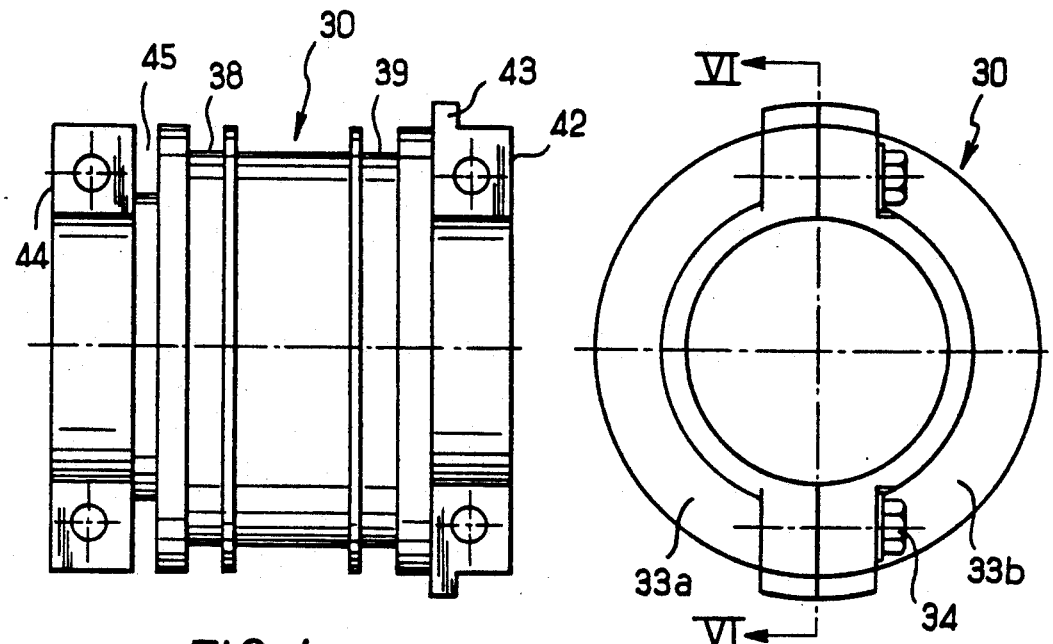
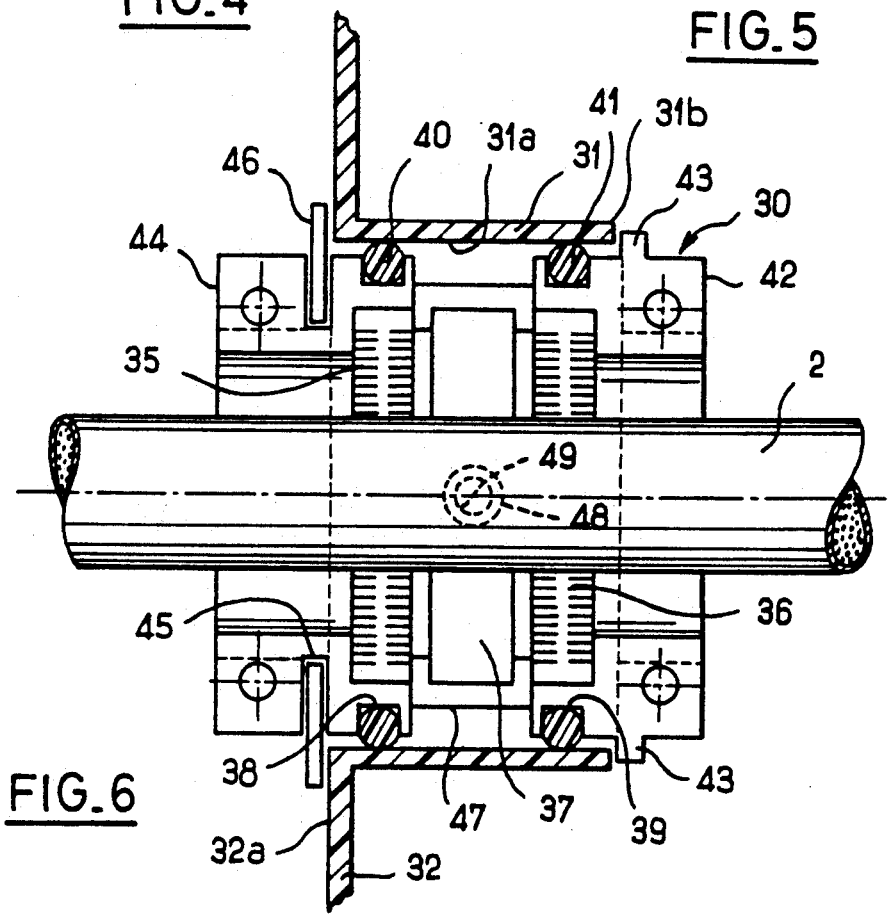
FIG.4  FIG.5  FIG.6

PLUG FOR FIXING IN AN IMPERMEABLE MANNER AN ELECTRIC CABLE TO AN OPENING AND CABLE PROTECTION SLEEVE COMPRISING SUCH PLUGS

The present invention relates to a plug which makes it possible to fix in an impermeable manner an electric or telephone cable to a circular opening for passage of said cable.

There has already been described, in the French patent 2 466 887 of the applicant for example, a connector which is intended to surround an electric or telephone cable and makes it possible to produce an impermeable connection between this cable and the end of a tube for passage of said cable.

This connector is intended to be filled with a sealing material such as polyurethane foam. Experience has shown that the impermeability thus obtained was not always sufficient.

Moreover, such connectors do not provide sufficient axial fixing of the cable to the end of the tube.

Furthermore, the fixing of the cable to the end of the tube, by means of such connectors, is difficult to remove, so that it is not easy to replace a cable by a new cable or one having a different diameter.

The aim of the present invention is to eliminate the disadvantages of the abovementioned embodiment, by creating a plug which makes it possible to fix in an impermeable manner an electric or telephone cable to a circular opening for passage of said cable, this plug providing perfect impermeability with regard to the opening and to the cable, perfect axial fixing of the cable to the opening and this plug being capable of being removed easily from the latter in order to replace the cable.

According to the invention, the plug which makes it possible to fix in an impermeable manner an electric or telephone cable to a circular opening for passage of said cable is characterised in that it comprises a hollow body which is constituted by two shells intended to be fixed around the cable and comprising at least two jaws which are retained radially in said body and each comprise a central opening for passage of the cable and are supported radially on this cable at the time of fixing by clamping of the two shells to one another, the two jaws defining between them a chamber intended to be filled with a sealing material, and in that said hollow body comprises means for fixing it in a removable and impermeable manner to said circular opening for passage of the cable.

The two jaws provide excellent axial fixing of the cable in relation to the plug, given that the openings of these jaws are clamped on the cable at the time of the assembly of the two shells of the hollow body.

Furthermore, the sealing material filling the chamber comprised between the two jaws and surrounding the cable provides excellent impermeability between this cable and the plug.

Moreover, given that the plug is fixed in a removable manner to the opening for passage of the cable, it can be removed easily from this opening in order to replace the cable.

According to an advantageous alternative of the invention, the plug intended to be fixed to the end of a tube for passage of the cable also comprises a sleeve which is intended to be introduced into said end of the tube and the external diameter of which corresponds to the internal diameter of said tube, this sleeve comprising all around one of its ends means for fixing it in a removable manner to one end of the hollow body.

According to a preferred alternative of the invention, the sleeve comprises at its end a flange and the hollow body comprises at its adjoining end an annular groove which is shaped to engage on said flange of the sleeve.

Preferably, the sleeve comprises on its inside a cap which closes it completely, this cap being connected to the internal face of the sleeve by a narrowed and breakable annular zone which makes it possible to tear out this cap in order to pass the cable.

Thus, when the tube contains no cable, the cap of the sleeve closes in an impermeable manner the end of the tube, so that moisture cannot penetrate into the latter. In order to pass the cable into the tube, it is only necessary to remove the cap, to fix the plug around the cable, to inject a sealing material into the plug and then to fix the latter to the end of the tube.

According to another alternative of the invention, the plug which is intended to be fixed into a connector of circular cross-section projecting from a wall has the characteristic that the hollow body comprises on its external surface at least two annular grooves which each receive an O-ring intended to bring about the impermeability between the external surface of the hollow body and the internal surface of said connector.

Preferably, the hollow body comprises close to one of its ends a flange which is intended to be supported against the free end of the connector and close to its other end an annular channel which is intended to receive a key in the form of a circular arc which is intended to lock in a removable manner the hollow body against the internal face of said wall.

Said flange and said key thus axially lock the plug to the connector in an easily removable manner.

Other characteristics and advantages of the invention will emerge in the description below.

Figure 7:
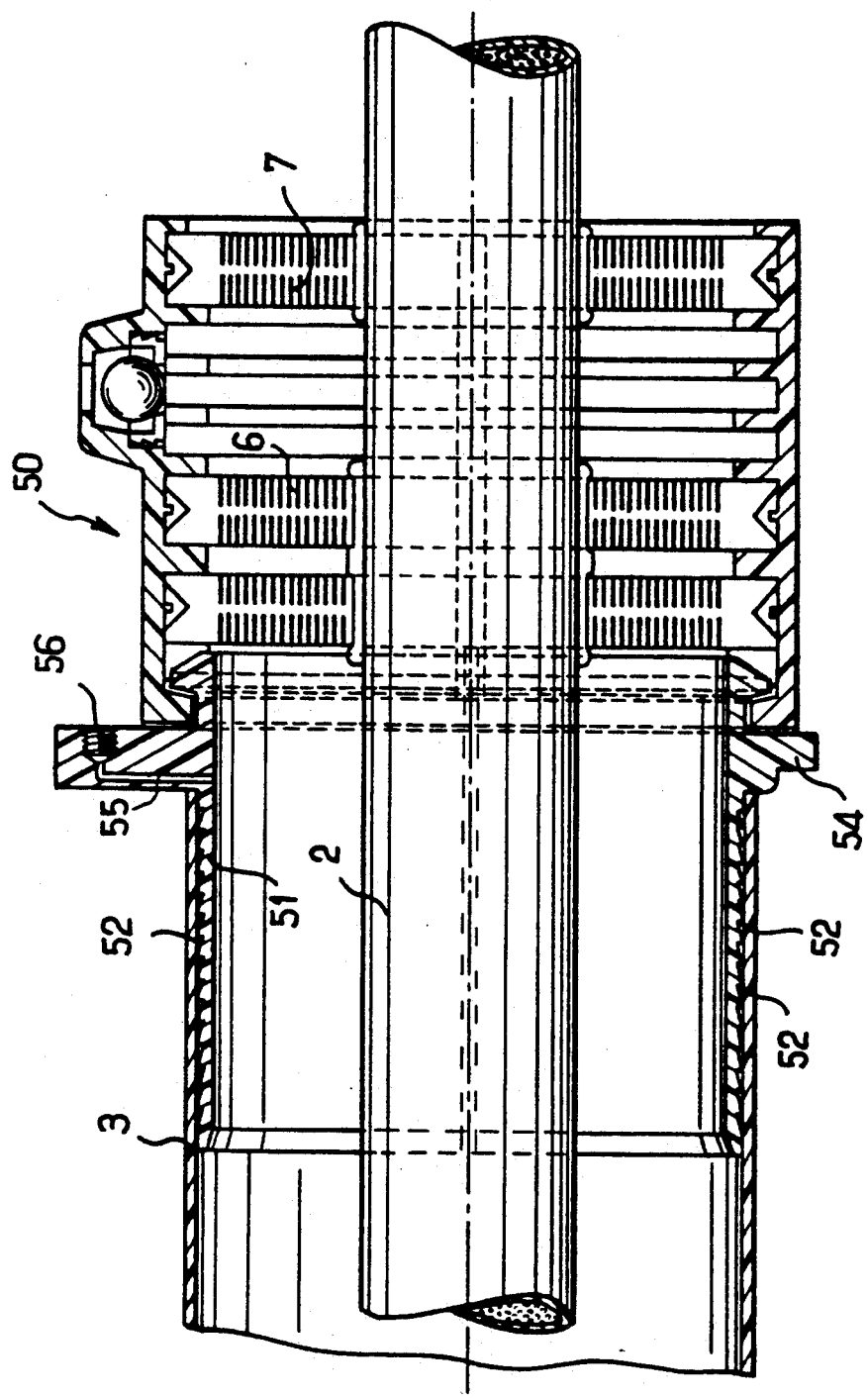
Figure 8:
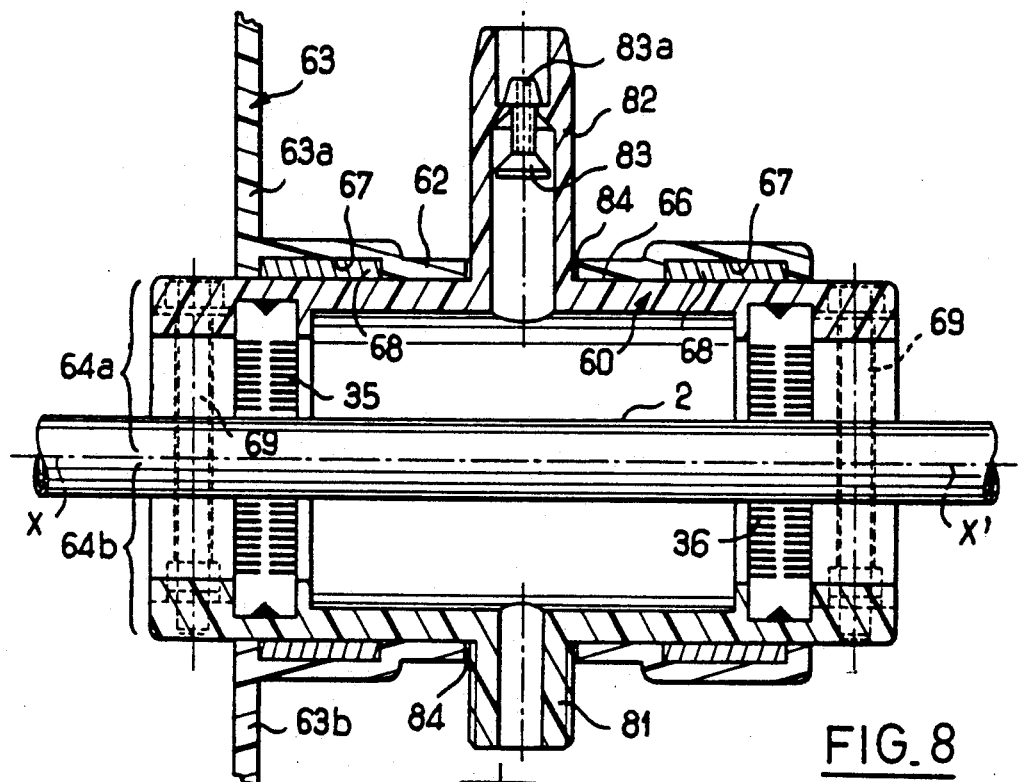
Figure 9:
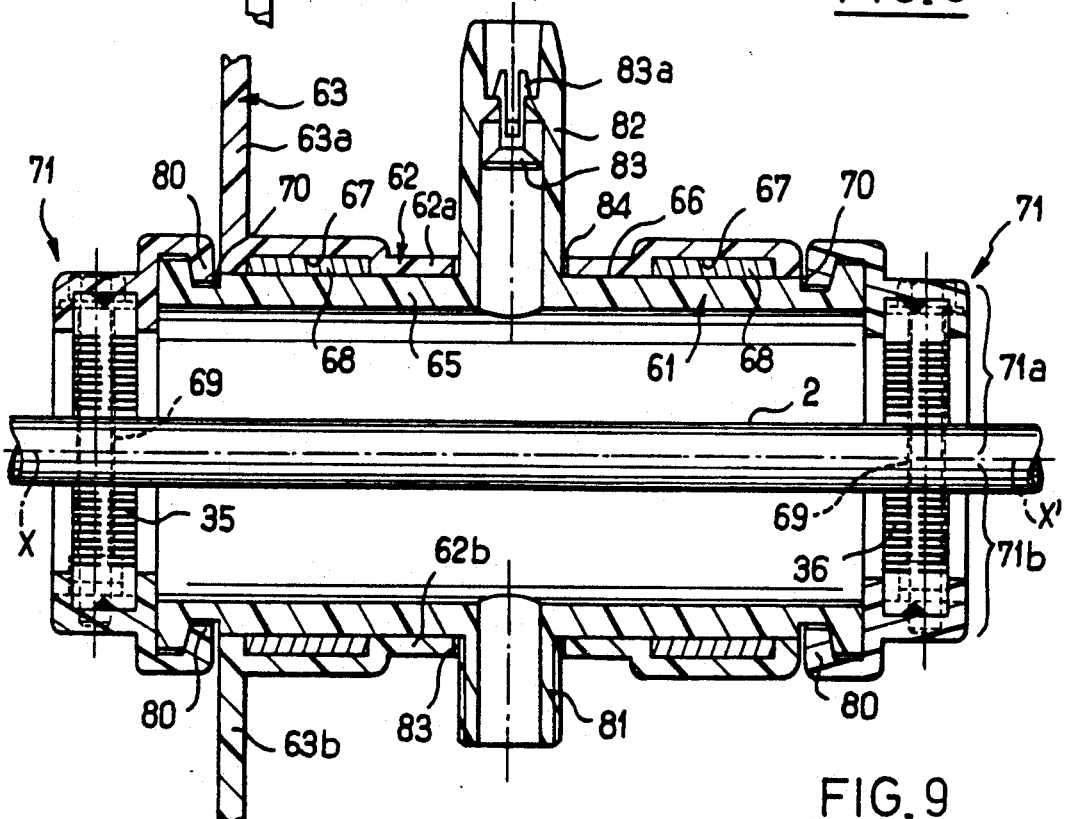
Figure 10:
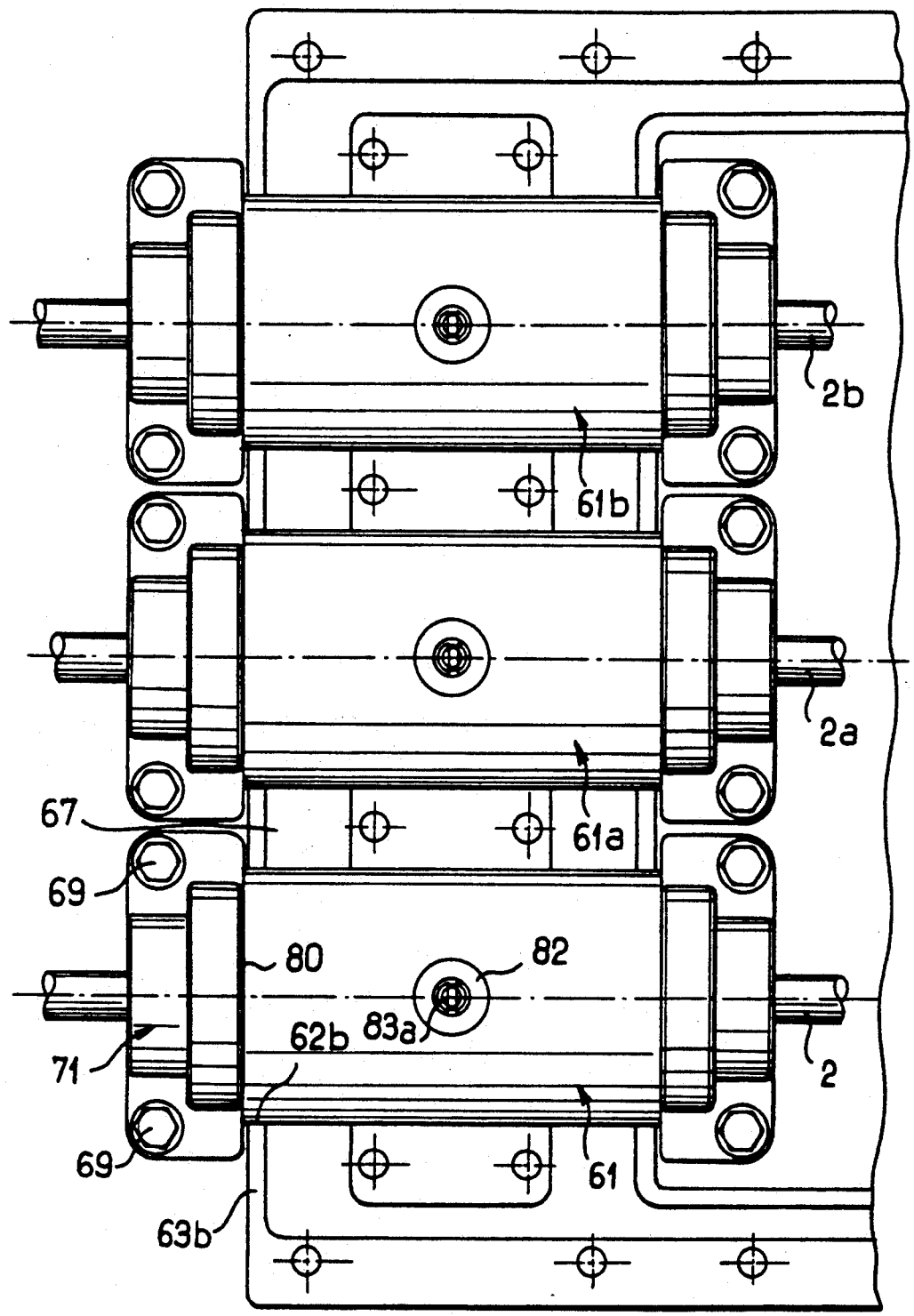

FIG. 1 is a view in longitudinal section of a plug according to the invention fixed around a cable and to the end of a tube, FIG. 2 is a view in section along the plane II—II in FIG. 1, FIG. 3 is a plan view of the plug fixed to the tube (shown in part), FIG. 4 is a plan view of another alternative of a plug according to the invention, FIG. 5 is an end view of this plug, FIG. 6 is a view in longitudinal section on the line VI—VI in FIG. 5 of the plug according to FIGS. 4 and 5, fixed around a cable and mounted in a connector, the sealing material being omitted for clarity of illustration FIG. 7 is a view in longitudinal section similar to FIG. 6, of an alternative embodiment of a plug according to the invention fixed to a tube, FIG. 8 is a view similar to FIGS. 6 and 7, in longitudinal section of an alternative embodiment of a plug accommodated in the connector of a protection sleeve for cable splices, FIG. 9 is a view similar to FIG. 8 relating to another embodiment of the plug, and FIG. 10 is a partial plan view from above of a protection sleeve for splices, the upper half-shell of this latter being removed, showing three plugs according to the invention.

In the embodiment in FIGS. 1 to 3, a plug 1 has been shown surrounding a telephone cable which extends in a tube 3 which is, for example, buried. This plug 1 is fixed in an impermeable manner to that end 4 of the tube 3 which has a circular opening.

The plug 1 comprises an essentially cylindrical hollow body 5 which is constituted by two shells made of plastic material 5a, 5b (see FIGS. 2 and 3) which are fixed around the cable 2 and comprise two jaws 6, 7 which are retained radially in grooves 8, 9 which are made in said body and each comprise a central opening 10, 11 for passage of the cable 2. These central openings 10, 11 are supported radially on the cable 2 at the time of fixing by clamping of the two shells 5a, 5b to one another.

The two jaws 6, 7 define between them a chamber 12 which surrounds the cable 2 and is filled with a sealing material which is injected into this chamber 12 via an opening 13 made in the wall of the body 5. Furthermore, the hollow body 5 is fixed in a removable and impermeable manner to the circular opening 4 for passage of the cable 2 into the tube 3.

The jaws 6 and 7 have been described in particular in French patent 2 582 854 of the applicant. They are made of plastic material and have annular channels which give them radial elasticity which makes it possible to bring about impermeability between the openings 10 and 11 of these jaws 6, 7 and the external surface of the cable.

In FIG. 1, it can be seen that the plug 1 also comprises a sleeve 14 made of plastic material which is engaged in the end 4 of the tube 3 and the external diameter of which corresponds to the internal diameter of this tube 3. The impermeable connection between the sleeve 14 and the internal surface of the tube 3 is provided by glueing. This sleeve 14 comprises all around its end means for fixing it in a removable manner to the adjoining end of the hollow body 5.

To this end, the sleeve 14 comprises at its end a flange 15 and the hollow body 5 comprises at its adjoining end an annular groove 16 which is shaped in order to engage on the flange 15 of the sleeve 14. Furthermore, a gasket 17 is provided between the annular groove 16 and the flange 15. Moreover, the sleeve 14 comprises at the rear of its flange 15 a second flange 18 which is supported against the end 4 of the tube 3 for passage of the cable 2. The two flanges 15 and 18 define between them an annular space 19, in which the end edge 20 of the hollow body 5 adjoining the annular groove 16 is engaged.

Furthermore, it is also visible in FIG. 1 that the sleeve 14 comprises on its inside a cap 21 (in broken lines) which closes it completely (when the tube 3 is not passed through by a cable), this cap 21 being connected to the internal face of the sleeve 14 by a narrowed breakable annular zone 22 which makes it possible to eliminate this cap 21 in order to pass the cable 2 into the tube 3.

As indicated in FIGS. 2 and 3, the two shells 5a, 5b of the hollow body 5 comprise on each side two projecting parts 23a, 23b which are supported on one another and are each provided with a ramp 24a, 24b which is inclined in relation to the plane of contact P of the two projecting parts 23a, 23b. These ramps 24a, 24b are associated with an assembly member 25 of essentially C-shaped cross-section comprising two counter-ramps 25a, 25b which are complementary to the ramps 24a, 24b of the two projecting parts and can engage with force on these latter in order to clamp the two projecting parts to one another.

These two assembly members 25 can, however, be replaced by screws passing through the projecting parts 23a, 23b.

FIG. 2 also shows that a gasket is provided between the projecting parts 23a and 23b.

To fix the plug 1, which has just been described, to the end of the tube 3, the following procedure is adopted. It is supposed that the sleeve 14 is already in place on the end 4 of the tube. This sleeve 14 closes in an impermeable manner the end of the tube 3, which protects the inside of the latter against moisture and dust. To put the cable 2 in place in the tube 3, it is only necessary to remove the cap 21 by pulling on the tab 21a in order to tear it out according to the circular zone 22 adjoining the internal surface of the sleeve 14, after which the cable 2 can be engaged in the tube 3.

The two shells 5a, 5b, which are provided with jaws 6, 7 of which the openings 10, 11 have been adapted in advance to the diameter of the cable 2, are then fixed around the cable 2. Before clamping the shells 5a, 5b to one another, the end groove 16 of the two shells is engaged on the flange 15 of the sleeve 14. It is then only necessary to push, on each side of the plug 1, the assembly members 25 onto the ramps of the projecting parts 23a, 23b.

Finally, a sealing material is injected into the opening 13 of the plug in order to fill the chamber 12 which is comprised between the jaws 6, 7 and which surrounds the cable 2.

If it is desirable to withdraw the cable 2 from the tube 3, in order to replace it by a new cable or one of different diameter, it is only necessary to dismantle the two shells 5a, 5b and to repeat the above operation, using a new plug.

In FIGS. 4 and 5, a plug 30 has been shown which is intended to be fixed as indicated in FIG. 6 in a connector 31 of circular cross-section which projects from a wall 32.

As in the case of the embodiment according to FIGS. 1 to 3, the plug 30 is of cylindrical shape and comprises two shells 33a, 33b (see FIG. 5) which are assembled with one another by means of screws 34.

The cylindrical hollow body defined by the two shells 33a, 33b comprises on its inside two jaws 35, 36 which are identical to the jaws 6, 7 of the embodiment according to FIGS. 1 to 3, extend radially and are supported elastically on the cable 2.

These jaws 35, 36 define between them a chamber 37 which is intended to be filled with a sealing material.

The hollow cylindrical body 30 comprises on its external surface two annular grooves 38, 39 which each receive an O-ring 40, 41 which brings about the impermeability between the external surface of the hollow body 30 and the cylindrical internal surface 31a of the connector 31. It can moreover be seen in FIG. 6 that the hollow body 30 comprises close to its end 42 a flange 43 which is supported against the free end 31b of the connector 31 and close to its other end 44 an annular channel 45 which receives an elastic key or ring in the form of a circular arc 46 which makes it possible to lock in a removable manner the hollow body 30 against the internal face 32a of the wall 32.

Furthermore, the external surface of the hollow body 30 comprises, between the two grooves 38, 39 which are provided in order to receive a gasket 40, 41, an annular recess 47 which communicates via an aperture 48 with the internal chamber 37 comprised between the two jaws 35, 36. The connector 31 also comprises an aperture 49 for injection of a sealing material intended to fill the annular recess 47 and the chamber 37.

To fix the cable 2 into the connector 31 in an impermeable manner, by means of the plug 30, the following procedure is adopted.

The two shells 33a, 33b are fixed around the cable 2. The O-rings 40 and 41 are placed in the grooves 38, 39 provided on the external surface of the plug 30. It is then only necessary to slide the plug 30 into the connector 31 until the flange 43 of the plug comes to bear against the free end 31b of the connector 31.

The plug 30 is then locked against the wall 32 by engaging the ring 46 in the channel 45. At the end of the operation, a sealing material is injected into the opening 49 of the plug 30 and fills the recess 47 comprised between the plug and the internal face of the connector 31 as well as the chamber 37.

As in the embodiment according to FIGS. 1 to 3, the plug 30 can be withdrawn from the connector 31 in order to remove the cable and to replace it by a new cable or one of different diameter.

In the embodiment in FIG. 7, the plug 50 differs from the alternative shown in FIG. 1.

The sleeve 51 comprises on its external surface, which is engaged in the tube 3 for passage of the cable 2, a series of annular grooves 52. These grooves 52 have a longitudinal section in the form of saw-teeth. These latter facilitate the glueing of the sleeve 51 in the tube 3.

Furthermore, in this example, the sleeve 51 is constituted by two half-shells which are assembled according to a plane passing through its axis.

Moreover, the sleeve 51 comprises close to the flange 54 a passage opening comprising a connection 56 which allows the screwing on of a valve (not shown) for bleeding gas. It is thus possible to detect any presence of gas in the tube 3 and to eliminate it by suction.

In the embodiments in FIGS. 8 and 9, the plugs 60, 61 are fixed in a connector 62 of circular cross-section which projects from a wall 63 constituting the end wall of a protection sleeve for the splice of one or of more cables. The hollow body 64, 65 has a smooth external surface 66, the diameter of which corresponds to the internal diameter of the connector 62.

The internal surface of the connector 62 comprises at least two annular grooves 67 of rectangular cross-section which each receive a gasket 68 of complementary cross-section made of flexible material in order to bring about the impermeability between the external surface 66 of the hollow body 64, 65 and the internal surface of the connector 62.

In the example in FIG. 8, the hollow body 64 is constituted by two half-shells 64a, 64b which are assembled according to a plane passing through the axis X—X' of the hollow body. These two half-shells 64a, 64b are clamped to one another by means of screws 69 placed at the two opposite ends of the hollow body 64.

In the embodiment in FIG. 9, the hollow body 65 is constituted by a tubular body in one single piece which comprises at each of its ends an annular groove 70. These ends of the body 65 are each provided with a jaw-holder 71 in two parts 71a, 71b which are assembled against one another perpendicularly to the axis X—X' of the tubular body 65 by means of clamping screws 69.

Each jaw-holder 71 comprises on its side adjoining the tubular body 65 a channel 80 in the form of a circular arc directed towards the axis X—X' of the body 65 and engaged in the annular groove 70 of this body. The two channels 80 in the form of a circular arc form a continuous circular channel when the two parts 71a, 71b of the jaw-holder 71 are assembled against one another, as indicated in FIG. 9.

As indicated above, the wall 63 is the end wall of a sleeve for protecting the splice of electric cables 2. This sleeve comprises two half-shells 63a, 63b which are assembled with one another according to a plane passing through the axis X—X' of the sleeve. Each end wall 63 of said sleeve comprises at least one connector 62 of circular cross-section which projects towards the inside of the sleeve and receives a plug 60 or 61.

In the embodiment shown in FIGS. 8 and 9, each connector 62 is in two parts 62a, 62b. Each connector part 62a, 62b is moulded in one single piece with the other connector part and they come to be assembled with one another according to the plane of assembly of the two half-shells 63a, 63b of the sleeve, which passes through the axis X—X'.

It can also be seen that the hollow body 64, 65 of each plug 60, 61 has two diametrically opposite tubular protuberances 81, 82. Each of these protuberances is engaged in an opening 83, 84 made in the corresponding part 62a, 62b of the connector.

Thus, when the two half-shells 63a, 63b are assembled according to X—X', the hollow body 64 or 65 is retained axially in the connector 62 as a result of the engagement of the tubular elements 81, 82 in the openings 83, 84.

In the example in FIGS. 8 and 9, the two tubular protuberances 81, 82 are constituted respectively by a pipe 81 for injection of resin into the inside of the hollow body 64, 65 and a pipe 82 in which there is mounted in a sliding manner a piston 83a provided with a rod 84a which can project on the outside of the pipe in order to indicate the filling level of the resin.

In FIG. 10, the lower half-shell 63b of a protection sleeve for three cables 2, 2a, 2b has been shown.

To this end, the half-shell 63b supports three connector parts such as 62b, in which three plugs 61, 61a, 61b are accommodated. These three plugs 61, 61a, 61b are captive on the inside of the sleeve after the upper half-shell (not shown in FIG. 10) has been put in place on the lower half-shell 63b.

We claim:

1. Plug which makes it possible to fix in an impermeable manner an electric or telephone cable (2) to the end (4) of a tube (3) of circular cross section for passage of said cable, said plug (1, 50) comprising a hollow body (5) having at least two shells (5a, 5b) adapted to be fixed around a cable (2) and to receive at least two jaws (6, 7) which are retained radially in said shells and each comprise a central opening (10, 11) for passage of the cable (2) and are supported radially on this cable at the time of assembly by clamping of the two shells to one another, the two jaws defining between them inside said hollow body (5) a chamber (12) adapted to be filled with a sealing material, said plug (1, 50) further comprising adaptation means for adapting said hollow body to said end (4) of the tube (3) and means sealing between said adaptation means and said tube and between said hollow body (5) and said adaptation means, said adaptation means (14, 51) being adapted to be partly introduced into said tube (3) and comprising radially projecting means (18, 54) adapted to abut against the end (4) of said tube section (3) as well as retaining means for placing and fixing said hollow body in a predetermined position with respect to said end (4) of the tube (3) so that said jaws are easily accessible and removable for removing and changing the cable (2).

2. Plug according to claim 1, said plug (1, 50) being adapted to be fixed to the end (4) of tube (3) for passage of the cable (2), said adaptation means comprising a sleeve (14, 51) which is adapted to be introduced into said end (4) of the tube and the external diameter of which corresponds to the internal diameter of said tube, said sleeve (14, 51) comprising all around one of its ends means for fixing to said sleeve in a removable manner one end (20) of the hollow body (5).

3. Plug according to claim 2, wherein the sleeve (14) comprises at its end a flange (15) and the hollow body (5) comprises at its adjoining end an annular groove (16) which is shaped to engage on said flange (15) of the sleeve (14).

4. Plug according to claim 3, wherein a gasket (17) is provided between the annular groove (16) and the flange (15).

5. Plug according to claim 3, wherein the sleeve (14) comprises at the rear of said flange (15) a second flange (18) which is intended to be supported against said end (4) of the tube (3) for passage of a cable (2), the two flanges (15, 18) defining between them an annular space (19) which receives an edge of said end (20) of the hollow body (5) adjoining the annular groove (16).

6. Plug according to claim 3, wherein the sleeve (14) comprises on its inside a cap (21) which closes the sleeve completely, said cap (21) being connected to the internal face of the sleeve (14) by a narrowed and breakable annular zone (22) which makes it possible to tear out said cap (21) in order to pass a cable (2).

7. Plug according to claim 6, wherein the two shells (5a, 5b) of the hollow body comprise on each side two projecting parts (23a, 23b) which are intended to be supported on one another and are each provided with a ramp (24a, 24b) which is inclined in relation to a plane of contact (P) of the two projecting parts (23a, 23b), said projecting parts being associated with an assembly member (25) of essentially C-shaped cross section comprising two counter-ramps (25a, 25b) which are complementary to the ramps (24a, 24b) of the two projecting parts (23a, 23b) and can engage with force on the two projecting parts in order to clamp the two projecting parts to one another.

8. Plug according to claim 2, wherein the sleeve (51) comprises on its external surface, which is intended to be engaged in the tube (3) for passage of a cable (2) a series of annular grooves (52).

9. Plug according to claim 8, wherein the grooves (52) have a longitudinal section in the form of saw-teeth.

10. Plug according to claim 8, wherein the sleeve (51) is constituted by two half-shells which are assembled in a plane passing through the axis of the sleeve.

11. Plug according to claim 5, wherein the sleeve (51) comprises close to the flange (34) a passage opening (55) which allows the screwing on of a valve for bleeding gas.

12. Plug which makes it possible to fix in an impermeable manner an electric or telephone cable (2) to a tubular connector (31, 62) of circular cross section which projects from a wall (32, 63) and is adapted for passage of a cable (2), said plug (30, 60, 61) comprising a hollow body (30, 64, 65) having at least two shells (33a, 33b; 64a, 64b; 71a, 71b) adapted to be fixed around a cable (2) and retaining at least two jaws (35, 36) radially in said shells, each jaw comprising a central opening (10, 11) for passage of the cable at the time of assembly by clamping of the two shells to one another, the two jaws defining between them inside said hollow body (30, 64, 65) a chamber (37) adapted to be filled with a sealing material, said plug (30, 60, 61) further comprising adaptation means for adapting said hollow body to said tubular connector (31, 62) and means sealing between said hollow body (30, 64, 65) and said tubular connector (31, 62), said hollow body (30, 64, 65) being adapted to be partly introduced into said tubular connector (3, 31, 62) and comprising radially projecting means (43, 81, 82) adapted to abut against complementary means (31b, 83, 84) of said tubular connector (31, 62) as well as retaining means for placing and fixing said hollow body in a predetermined position with respect to said tubular connector, so that said jaws are easily accessible and removable for removing and changing the cable (2).

13. Plug according to claim 12, said plug being adapted to be fixed in a tubular connector (31) of circular cross section projecting from a wall (32), the hollow body (30) comprising on its external surface at least two annular grooves (38, 39) which each receive an O-ring (40, 41) that seal between the external surface of the hollow body (30) and the internal surface of said connector (31).

14. Plug according to claim 13, wherein the hollow body (31) comprises close to one of its ends a flange (43) adapted to be supported against a free end of the connector (31) and close to its other end an annular channel (45) which is adapted to receive a key (46) in the form of a circular arc which locks in a removable manner the hollow body (30) against the internal face of said wall (32).

15. Plug according to claim 13, wherein the external surface of the hollow body (30) comprises, between said two grooves (38, 39), an annular recess (47) which communicates via an aperture (48) with the chamber (37) comprised between the two jaws (35, 36), the connector (31) comprising an aperture (49) for injection of a sealing material to fill the annular recess (47) and said chamber (37).

16. Plug according to claim 12, said plug (60, 61) being adapted to be fixed in a tubular connector (62) of circular cross section which projects from a wall (63) which constitutes the end wall of a protection sleeve for the splice of at least one cable, wherein the hollow body (64, 65) has a smooth external surface (66), the diameter of which corresponds to the internal diameter of the connector (62), the internal surface of the connector comprising at least two annular grooves (67) of rectangular cross section which each receive a gasket (68) of complementary cross section made of flexible material in order to seal between the external surface (66) of the hollow body (64, 65) and the internal surface of the connector (62).

17. Plug according to claim 16, wherein the hollow body (64) is constituted by two half-shells (64a, 64b) which are assembled according in a plane passing through the axis of the hollow body, these two half-shells (64a, 64b) being clamped to one another by screws (69) at two opposite ends of the hollow body (64).

18. Plug according to claim 16, wherein the hollow body (65) is constituted by a tubular body in one single piece which comprises close to each of its ends an annular groove (70), said ends each being provided with a jaw-holder (71) in two parts (71a, 71b) which parts (71a, 71b) are assembled against one another perpendicularly to the axis of the tubular body (65) by means of clamping screws (69), each jaw-holder (71) comprising on its side adjoining the tubular body (65) a channel (80) which is a circular arc directed toward the axis of the body and engaged in the annular groove (70) of this body, the two channels (80) in the form of a circular arc forming a continuous circular channel when the two parts (71a, 71b) of the jaw-holder (71) are assembled against one another.

19. Plug according to claim 16, the wall (63) and the tubular connector (62) being comprised by two separate wall parts (62a, 62b) each having a separate connector part (63a, 63b) and assembled along an assembly plane containing the axis of the tubular connector (62), each connector part (62a, 62b) comprising a circular aperture (83, 84), said hollow body (64, 65) comprising two tubular protuberances (81, 82) each engaged in one of said apertures (83, 84) respectively.

20. Plug according to claim 19, wherein the two tubular protuberances (81, 82) are constituted respectively by a pipe for injection of resin into the inside of the hollow body and a pipe in which there is mounted in a sliding manner a piston (83a) provided with a rod (84a) which can project beyond the pipe in order to indicate the filling level of the resin.

21. Sleeve for protecting the splice of electric cables (2, 2a, 2b), comprising two half-shells (63a, 63b) which are assembled with one another according on a plane passing through the axis (X—X') of the sleeve, each end of said sleeve comprising at least one connector (52) of circular cross section which projects toward the inside of the sleeve and receives a plug (60, 61) according to claim 16.

22. Sleeve according to claim 21, wherein connector (62) is in two parts (62a, 62b), each connector part being molded in one single piece with the other connector part and coming to be assembled with one another according to the plane of assembly of the two half-shells (63a, 63b) of the sleeve.

23. Sleeve according to claim 22, wherein the hollow body (64, 65) of each plug (60, 61) has two diametrically opposite tubular protuberances (81, 82), each of these protuberances being engaged in an opening (83, 84) made in the corresponding part of the connector.

24. Sleeve according to claim 23, wherein the two tubular protuberances (81, 82) are constituted respectively by a pipe for injection of resin into the inside of the hollow body and a pipe in which there is mounted in a sliding manner a piston (83a) provided with a rod (84a) which projects on the outside of the pipe in order to indicate the filling level of the resin.

* * * * *